United States Patent Office 3,006,875
Patented Oct. 31, 1961

3,006,875
WATER-REPELLENT MASONRY COATING COMPOSITION CONTAINING FILLER COATED WITH AN ORGANOPOLYSILOXANE AND MASONRY COATED THEREWITH
Leo Liberthson, New York, N.Y., and Henry Lipkind, Nutley, N.J., assignors to Sonneborn Chemical and Refining Corporation, a corporation of Delaware
No Drawing. Filed Mar. 15, 1955, Ser. No. 494,545
6 Claims. (Cl. 260—22)

This invention relates to a water-repellent masonry coating.

Oleo-resinous base paints such as paints made with vehicles comprising vegetable drying oils, as for example, linseed oil, soya bean oil, China wood oil blended with resinous components, have been used for coating masonry surfaces. These coatings, however, are not water-repellent and their tendency to absorb and adsorb moisture has always limited their life, as manifested by peeling, cracking, alligatoring and, on alkaline cement surfaces, saponification.

One object of this invention is a water-repellent coating having an oleo-resinous vehicle for masonry surface. This and still further objects will become apparent from the following description.

We have found that when a siliceous filler material which has been precoated with a polysiloxane is incorporated in a conventional oleo-resinous base paint, an extremely water-repellent coating is obtained which is ideally suited for application to masonry surfaces.

The filler material may be any inert siliceous aggregate having a particle size between 30 and 80 mesh, and preferably 40 to 60 mesh, such as divided silica, pumice, mica, clay, diatomaceous earth, expanded slag, or similar light weight aggregates chemically consisting of silica, magnesium silicate, aluminum silicate and complexes thereof.

If desired, the coating may also contain a fibrous siliceous material, such as asbestos fibre having a fiber length from $\frac{1}{16}$ to $\frac{1}{4}''$, and preferably $\frac{1}{8}''$ fiber length, as for example, in amount of about 1–3% by weight.

The siliceous material is coated with the polysiloxane by wetting it with a 1 to 5%, and preferably a 2 to 3% solution of the polysiloxane in a volatile organic solvent, or with an aqueous emulsion of the polysiloxane, thereafter permitting the solvent to volatize, or driving off the aqueous phase of the emulsion if the latter is used.

The polysiloxane may be any of the commercially available or water emulsifiable polysiloxane. Among the polysiloxanes which have been found effective are ethyl triethoxy silane, vinyl triethoxy silane, ethyl, ethyl methyl, and ethyl phenyl siloxane. It has been found preferable to use ethyl or methyl phenyl polysiloxane as the silicone.

The volatile solvents used in forming the polysiloxane solutions may be any conventional solvent of the aromatic type such as xylol or refined coal tar naphtha or any aliphatic or aliphatic-aromatic petroleum distillate, as for instance, mineral spirits or Stoddard solvent; or turpentine, or mixtures of the above.

After the siliceous material is wetted with the 1 to 5%, and preferably 2 to 3%, solution of the polysiloxane used, or with an aqueous emulsion of the polysiloxane, the material is permitted to air-dry or may be force-dried at any suitable temperature below the flash point of the solvent or, if an aqueous emulsion is used, at temperature, for instance 175° F., for a sufficient period of time to expel all the moisture.

It is believed that when the siliceous materials are coated with the solvent solution or aqueous emulsion of the polysiloxane and the solvent or water is driven off, the silicone is absorbed on the surface of the siliceous material in a mono-molecular film or layer. It is further believed that this layer is molecularly bonded to the surface of the siliceous particle with such tenacity as to be substantially immune to the solvent action of the paint vehicle.

In the production of the water-repellent masonry coating or paint, the active pigments in accordance with this invention are first ground in a conventional manner, as for instance by ball mill or pebble mill into the paint vehicle, and a previously prepared silicone coated filler material is mechanically stirred into the grind.

The new water-repellent coatings, in accordance with the invention, may consist of 50 to 60%, and preferably 55%, by weight of solids including the pigment and polysiloxane coated siliceous materials, and 50 to 40%, and preferably 45%, with vehicle.

The coatings may contain 20 to 30% by weight of any conventional active pigments, as for instance lithopone, titanium dioxide, mixtures of titanium dioxide with barium, or calcium sulfate, normal and basic lead carbonates, and sulfates or mixtures thereof. Small amounts of tinting pigments, familiar in paint manufacture, may be added if desired for deep colors in lieu of white active pigment. Iron oxide of the various colors obtainable, greens such as chrome green, and mixtures of lead chromate and ferro- or ferri-cyanides of iron may be used.

Polysiloxane coated siliceous material may be incorporated in the amount of 25 to 35% by weight of the total coating materials.

The vehicle may contain 35 to 45%, and preferably 40%, by weight of the vehicle solids, and 65 to 55%, and preferably 60%, by weight of thinners and driers such as naphthanates, hexoates, octoates, or linoleates of cobalt, manganese, lead or zinc.

The vehicle solids may consist of any oleo-resinous base materials such as vegetable drying oils or, for example, linseed oil, soya bean oil, China wood oil, etc., and any conventional resins such as alkyd resins, modified phenolic resins, etc. The vehicle solids may additionally contain plasticizers, such as poly-butene esters, flame-retardant materials such as chlorinated waxes, and fungus inhibitors such as pentachlorophenol, or conventional organic mercury, or copper derivatives such as mercuric naphthanate or copper-8-quinolinolate. In order to impart body to the vehicle and serve as a grinding aid, metallic soaps such as aluminum, zinc or calcium stearate may be additionally added to the vehicle solids.

The following examples are given by way of illustration and not limitation:

*Example 1*

Pumice having a particle size of 40 to 60 mesh, mica having a flake size of 0.1 to 0.5 mm., natural pure white fibrous magnesium silicate sold under the trade name of "Asbestine," finely divided diatomaceous silica sold under the trade name of "Dicalite," asbestos fiber having a fiber length averaging $\frac{1}{8}''$ were thoroughly mixed and wetted with a 2.5 to 3.5% solution of ethyl phenyl polysiloxane in xylol. After wetting with this solution, the mixture of fillers was dried by blowing hot air at a temperature of 175° F. until the material was substantially free from solvent.

The now silicone coated filler material were then mechanically dispersed in a previously prepared paint grind wherein titanium dioxide was ground into the paint vehicle in a conventional pebble mill.

The relative proportion of solid pigment and filler material in the final coating composition was as follows: 47.1% titanium oxide; 22.1% pumice; 11.8% mica; 8.8% Asbestine; 4.4% Dicalite; 4% asbestos fiber. The relative percentages of vehicle solids, thinners and driers in the vehicle in which the above pigments were incorporated were: 39.9% oils and resins; 60.2% thinners and dryers.

The vehicle solids in the above consisted of 50.7% by weight alkyd resin; 17.4% by weight of a colorless liquid chlorinated paraffin containing 40% combined chlorine by weight, known under the trade name of "Chlorowax 40"; 27.3% polymerized soya bean oil, 4.6% of calcium linoleate, and 1.8% of zinc stearate.

The final coating contained a total of pigment and silicone coated siliceous fillers of 56.3% and 43.7% of the vehicle.

*Example 2*

The coating material formed in Example 1 was brushed on a porous, concrete black surface. After drying, the material formed a painted surface comparable in appearance and texture to that obtained with the best textured masonry paints. In addition, the coating was extremely water-repellent and retained its water-repelling qualities after repeated washing with water and detergent.

*Example 3*

A coating was prepared in the manner described in Example 1 except that in place of the xylol solution of the ethyl phenyl polysiloxane, an aqueous emulsion containing about 3% of the ethyl phenyl polysiloxane was used to coat the divided siliceous material.

The preparation of the coating was in all other respects identical with that described in Example 1 and the final coating obtained had properties identical to that of the coating of Example 1.

We claim:

1. A waterproof masonry coating material comprising an oleo-resinous base paint containing a pigment, a drying oil and a synthetic resin and additionally containing as filler about 25–35% by weight of an inert material selected from the group consisting of silica and the silicates of calcium, aluminum and magnesium having a particle size, of from 30–80 mesh and coated with an organopolysiloxane selected from the group consisting of lower alkyl and lower alkyl aryl polysiloxanes, the alkyl radical of said group members containing up to 2 carbon atoms.

2. Composition according to claim 1 in which the pigment is present to the extent of from 20–30% by weight of the coating material.

3. Masonry coating material, according to claim 1, in which said first mentioned group member coated with said organopolysiloxane is a material formed by contacting said first mentioned group member with a 1 to 5% solvent solution of said organopolysiloxane, and thereafter driving off the solvent.

4. Masonry coating material, according to claim 1, in which said first mentioned group member coated with said organopolysiloxane, is a material formed by contacting said first mentioned group member with an aqueous emulsion containing from 1 to 5% of said organopolysiloxane and thereafter driving off the water.

5. Masonry coating material according to claim 1, in which said organopolysiloxane is ethyl-phenyl-polysiloxane.

6. A masonry surface coated with an oleo-resinous base paint containing a pigment, a drying oil and a synthetic resin and additionally containing about 25 to 35% by weight of a particled material selected from the group consisting of silica and the silicates of calcium, aluminum and magnesium, having a particle size of from 30 to 80 mesh and coated with an organopolysiloxane selected from the group consisting of lower alkyl and lower alkyl aryl polysiloxanes, the alkyl group of said group members containing up to 2 carbon atoms.

References Cited in the file of this patent

UNITED STATES PATENTS

| | | |
|---|---|---|
| 2,615,006 | Lane | Oct. 21, 1952 |
| 2,679,491 | Kennedy et al. | May 25, 1954 |
| 2,720,495 | Phreaner | Oct. 11, 1955 |